United States Patent [19]

Kato et al.

[11] 4,428,225
[45] Jan. 31, 1984

[54] DEVICE FOR MEASURING THE IMBALANCE OF AN OBJECT

[75] Inventors: Shunichi Kato, Yokohama; Tetsuo Aikawa, Chiba, both of Japan

[73] Assignee: Tokyo Shibaura Denki Kabushiki Kaisha, Kawasaki, Japan

[21] Appl. No.: 352,237

[22] Filed: Feb. 25, 1982

[30] Foreign Application Priority Data

Apr. 10, 1981 [JP] Japan .............................. 56-51816[U]

[51] Int. Cl.³ ............................................. G01M 1/14
[52] U.S. Cl. ......................................... 73/65; 73/483; 73/862.04
[58] Field of Search ...................... 73/65, 66, 483, 484, 73/486, 862.04

[56] References Cited

U.S. PATENT DOCUMENTS 2,338,057 12/1943 Petersen ................................ 73/483
3,587,296 6/1971 Povoas .................................... 73/65
3,741,328 6/1973 Anderson et al. ........... 73/862.04 X
4,052,905 10/1977 Brendel et al. ....................... 73/483

Primary Examiner—Charles A. Ruehl
Attorney, Agent, or Firm—Oblon, Fisher, Spivak, McClelland & Maier

[57] ABSTRACT

A device for measuring the imbalance of a disc-like object has at least three load sensors having cantilevers for supporting the object at their corresponding measuring points selected, with a same angular distance therebetween, on a measuring circle which is concentric with a circular through-hole of the object. Each of the caltilevers is extended tangential to the measuring circle and directed perpendicular to the line of sight in the same sense when viewed from the center of the through-hole. A positioning device positions the center of the through-hole in the object relative to the load sensors, and a calculator device for calculating the imbalance of the object using the data supplied from the plural load sensors.

1 Claim, 10 Drawing Figures

DEVICE FOR MEASURING THE IMBALANCE OF AN OBJECT

BACKGROUND OF THE INVENTION

1. Field of the Invention

The present invention relates to a device for measuring a imbalance of a disc-like object provided with a circular through-hole in the center thereof.

2. Description of the Prior Art

The imbalance of the disc-like object is generally expressed by first and second amounts. The first amount means an angular moment caused by the imbalance of the object when the object is rotated with its diameter as an axis, that is, a value of torque when torque becomes maximum according to a way of setting the diameter. The second amount means a direction in which a radius of those extending perpendicular to the diameter, by which the maximum torque is obtained, from the center of the object and present on the side lowered by the maximum torque extends from the center, and the value of second amount is expressed by the angle relative to a reference axis appropriately selected. In the following description, the first amount is shown as maximum torque value, the second amount as maximum torque direction, and the imbalance measuring of the object is performed by determinations of the maximum torque value and the direction.

Figure 1:
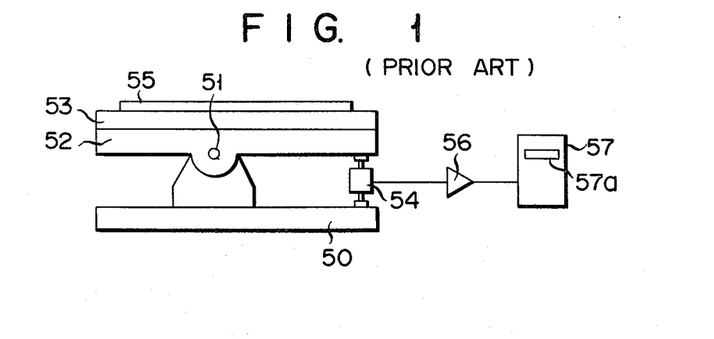
FIG. 1 shows an example of conventional device for measuring the imbalance of an object.

Various devices for measuring the imbalance of disc-like object are well known. Typical of these conventional devices is a kind of static measuring device wherein the object is rotated slowly engaging with the force measuring means which can measure the change of force, and the changing amount of force added to the force measuring means due to the imbalance of the object is measured, and the imbalance of the object is calculated by the result of the measurements; and the stationarily measuring device shown in FIG. 1. The preceding measuring device was made complicated and large-sized and took a longer time in measurment because this device made it necessary to rotate the object. On the other hand, the stationary measuring device shown in FIG. 1 includes a base 50, a swing bearing 51 arranged to the base 50, a table 52 attached freely swingable to the swing bearing 51, and a rotary table 53 mounted freely rotatable on the table 52. One end portion of table 52 is supported by a load sensor 54 and a disc-like object 55 is mounted on the table 53. The object 55 is rotated and stopped together with the table 53 every predetermined angle. Signals supplied from the load sensor at every rotation stop are amplified by an amplifier 56. Amplified signals are operated by a computer 57 and the imbalance of the object thus obtained is displayed on a display means 57a. It was necessary in this case that measurement be carried out at two angular positions of the table 53. Therefore, it took a longer time to measure. In addition, a precise bearing such as air bearing was needed to enhance measuring accuracy, thus making the cost of device high.

SUMMARY OF THE INVENTION

The present invention is therefore intended to eliminate these drawbacks and the object of the present invention is to provide a device simple in construction and small-sized and capable of measuring the imbalance of an object with high accuracy and in a short time.

This object of the present invention is achieved by a device for measuring the imbalance of a disc-like object which has a circular through-hole in the center thereof having three or more load sensors arranged the same distance from the center of a circular through-hole formed in the object and with a same angular distance between two sensors, and having cantilevers for supporting the object at their upper ends. The load sensors are also arranged in such a way that upper ends of cantilevers support the object at their corresponding measuring points selected on a measuring circle which is concentric with the center of through-hole, and that cantilevers are extended tangential to the measuring circle and directed perpendicular to the line of sight and in same sense when viewed from the center of through-hole. A positioning device for positioning the object relative to load sensors includes a taper rod arranged freely movable up and down and having a tapered portion fitted into the circular through-hole, and a support rod is arranged freely movable up and down outside the taper rod. A calculator device has outputs supplied from load sensors to calculate the imbalance of a measured object.

When the device for measuring the imbalance of an object according to the present invention is employed, the object can be easily located to a predetermined position on plural load sensors of cantilever type using the positioning means. Since it is unnecessary that the object is rotated to allow its movement to be measured, the device can be made small-sized and simple in construction. Load sensors of cantilever type enable the imbalance of the object to be minutely measured. Each of cantilevers of load sensors is extended from its load sensor passing through the point, at which its upper end contacts the underside of the object, to be tangential to the circle which takes the center of the object as its center, and to be perpendicular to the line of sight and directed in the same sense when viewed from the center of the circle. Therefore, no effect acts on the measured results applied from load sensors even if upper ends of the cantilevers are shifted on the underside of the object in the direction in which the cantilevers are extended. In addition to these merits, the device of the present invention is easy to handle and maintain and can be manufactured with low cost.

DETAILED DESCRIPTION OF THE PREFERRED EMBODIMENT

Figure 2:
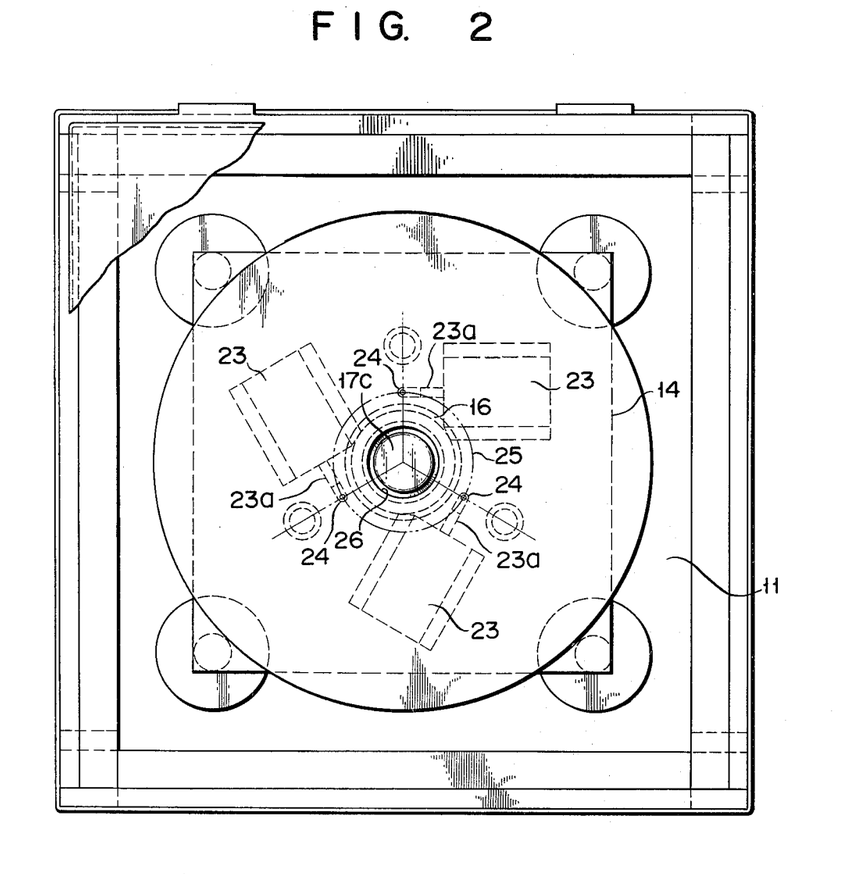
FIG. 2 is a plan view showing an embodiment of the present invention.
Figure 3:
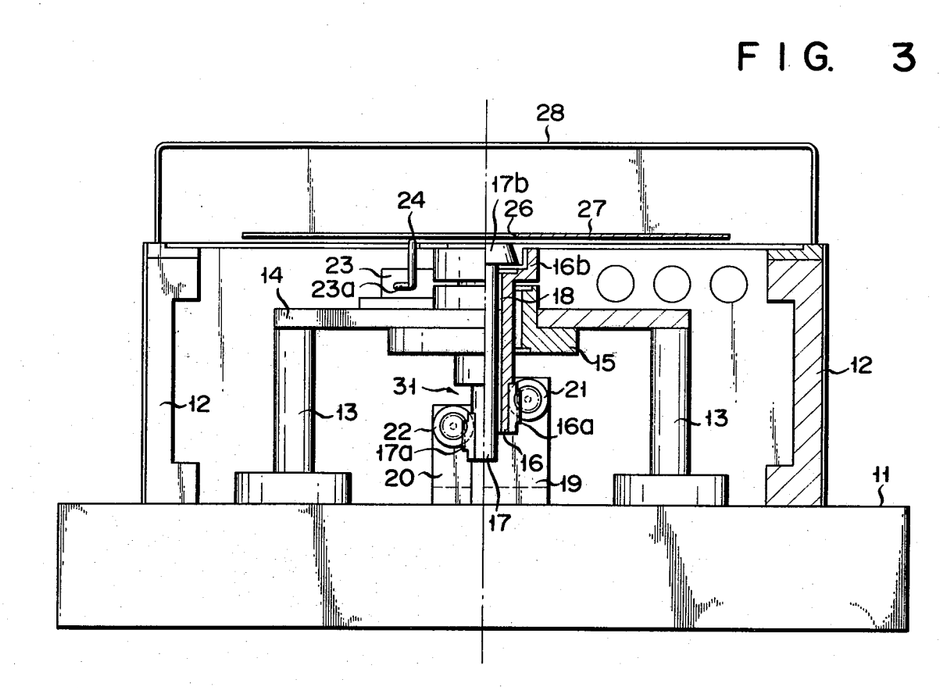
FIG. 3 is a partially sectioned front view showing the embodiment of FIG. 2.
Figure 4:
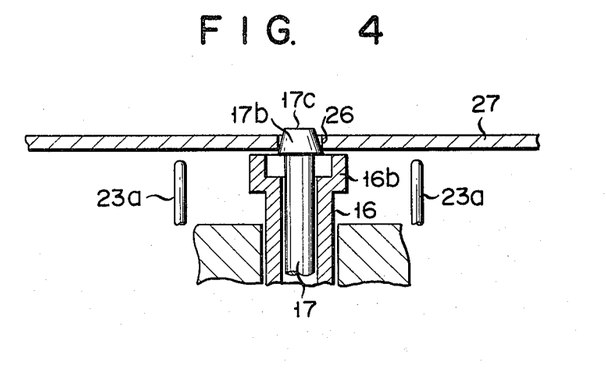
FIG. 4 shows the condition under which a taper rod is fitted into a through-hole of an object to set the position of the object.
Figure 5:
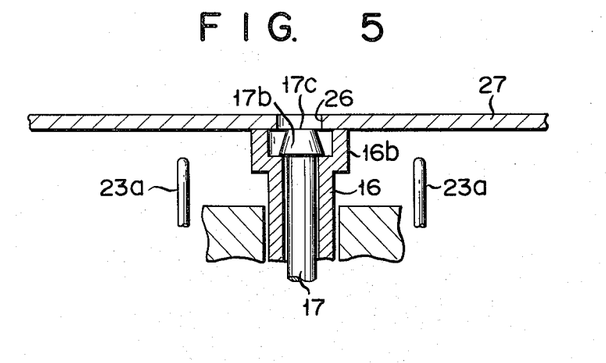
FIG. 5 shows the condition under which the upper end of a support rod supports the object.
Figure 6:
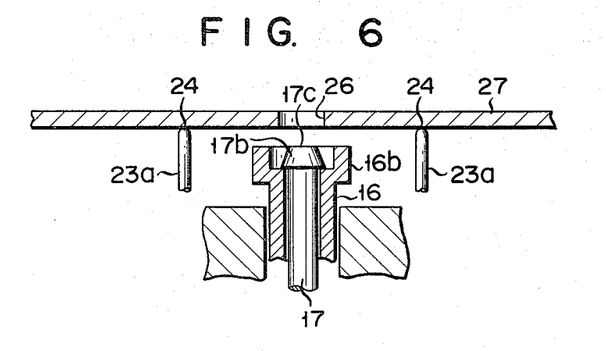
FIG. 6 shows the condition under which support and taper rods are lowered and the object is supported by load sensors.

Referring to FIGS. 2 and 3, support legs 12 are erected on a base 11 and outer support legs 13 are also erected inside support legs 12 on the base 11. A support plate 14 is mounted on upper ends of support legs 13. From the underside of support plate 14 is fixedly fitted a bearing member 15 into the center portion of support plate 14. A support rod 16 is inserted into the bearing member 15 so as to freely move up and down and a taper rod 17 is also inserted into the support rod 16 so as to freely move up and down. Namely, a through-hole 18 is formed in the center portion of support rod 16 along the longitudinal axis thereof and the taper rod 17 is inserted into the through-hole 18 so as to freely move up and down. Support legs 19 and 20 are further erected on the base 11 and a pinion 21 which engages with a rack 16a fixed to the support rod 16 is freely rotatably supported by the support leg 19 while a pinion 22 which engages with a rack 17a fixed to the taper rod 17 is freely rotatably supported by the support leg 20. The upper end portion of support rod 16 projects upwards from the upper end of bearing member 15 and has a larger-diameter portion 16b in which a tapered portion 17b of taper rod 17 is located so as to slidably move up and down, as shown in FIGS. 4 through 6, which are used to explain the relative movement between the support rod 16 and the taper rod 17. As shown in FIGS. 2 and 3, three load sensors 23 of cantilever type are fixed to the support plate 14. A cantilever 23a of each of sensors 23 includes a horizontally projecting portion and a vertical portion projecting vertically from the foremost end of horizontal portion to support on the upper end thereof an object 27 to be measured at the time of measurement. Upper ends of vertical portions of cantilevers 23a (three cantilevers in FIG. 2) are positioned on a same horizontal plane and movable up and down keeping their upper ends on a same horizontal plane. Those points of the object 27 at which the object 27 is supported by upper ends of vertical portions of cantilevers 23a are regarded as measuring points 24. Only two vertical portions of cantilevers 23a are shown in FIGS. 4 through 6 and one load sensor 23 and its cantilever 23a are shown for clarity in FIG. 2. Load sensor 23 are positioned and directed on the support plate 14 in such a way that upper ends of vertical portions of cantilevers 23a are contacted with the underside of the object of their corresponding plural measuring points selected on a measuring circle 25 which is concentric with an upper end face 17c of taper rod 17 and has a predetermiined radius, and that those directions in which horizontal portions of cantilevers 23a project are tangential to the measuring circle 25 when viewed in vertical direction while all of the horizontal portions of cantilevers 23a are extended perpendicular to the line of sight and are directed in the same direction (to the left in this case) when viewed from the center O of a through-hole 26 in FIG. 2. The object 27 having the circular through-hole 26 in the center portion thereof is mounted on upper ends of vertical portions of cantilevers 23a of three load sensors 23. A dust cover 28 shown above in FIG. 3 is attached on support legs 12.

Figure 7:
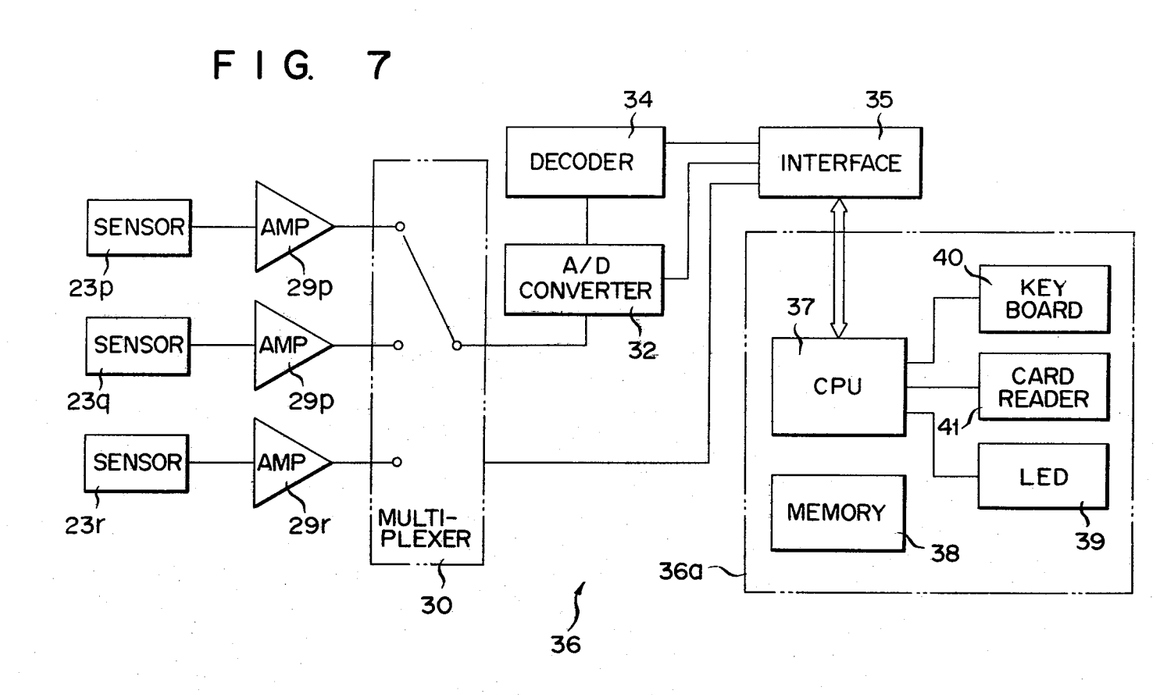
FIG. 7 is a circuit diagram employed by the present invention.

FIG. 7 is a circuit diagram showing a calculator device 36 for calculating the imbalance of the measured object 27 using outputs applied from load sensors 23. The arrangement and operation of this circuit will be described later together with the operation of mechanism shown in FIGS. 2 and 3.

When the imbalance of the object 27 is measured, the positioning of the object 27 relative to load sensors 23 is set using the circular through-hole 26, and upper ends of vertical portions of cantilevers 23a of load sensors 23 support the object 27 at predetermined points thereof. A positioning device 31 is arranged for this purpose. By means of this positioning device 31, the positioning of the object 27 is carried out as follows: the object 27 is mounted on cantilevers 23a in such a way that the center of the through-hole 26 in the object 27 comes substantially aligned with the center of the taper rod 17; the pinion 22 (FIG. 3) is rotated and the taper rod 17 is thus lifted to fit its tapered portion 17b into the through-hole 26 of the object 27, as shown in FIG. 4, so that the object 27 is positioned concentric with the taper rod 17; the pinion 22 is then rotated reversely to lower the taper rod 17; when the pinion 27 is rotated to lift the support rod 16, the larger-diameter portion 16b of support rod 16 supports the object 27, as shown in FIG. 5; and when both of support rod 16 and taper rod 17 are quietly lowered, the object 27 is mounted on and supported by upper ends of cantilevers 23a of three load sensors 23, as shown in FIG. 6. The support rod 16, rack 16a, taper rod 17, rack 17a and pinions 21, 22 form the positioning device 31 in this sense.

When the object 27 is positioned using its through-hole 26 and mounted on cantilevers 23a, each of the outputs of the three load sensors 23 (which are represented by 23p, 23q and 23r in FIG. 7) is supplied to the calculator device 36, as shown in FIG. 7. Outputs applied from load sensors 23p, 23q and 23r to the calculator device 36 are amplified by amplifiers 29p, 29q and 29r, converted through a multiplexer 30, digitized successively by an A/D converter 32 in the order of load sensors 23p, 23q and 23r, coded by a decoder 34, and supplied to a computer 36a through an interface 35. The computer 36a which has received data signals supplied through the interface 35 calculates the imbalance value of the object 27 on the basis of an arithmetic principle shown in FIG. 8. At first the imbalance value of the object is calculated with respect to a rectangular coordinates of x and y crossing the center of the object.

Figure 8:
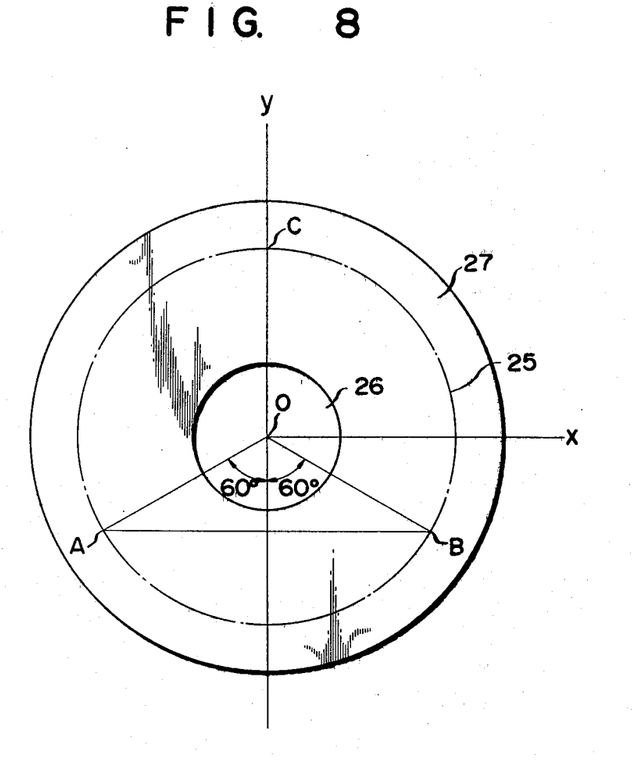
FIG. 8 is a view used to explain the principle of measuring the imbalance of the object according to the present invention.

In FIG. 8, O represents the center of the through-hole 26 in the object 27, ox and oy the rectangular coordinates of a point (x, y). Taking O as their origin, the straight lines OA, OB and OC extend from the point O with an angle of 120° interposed therebetween. The line OC is positioned to be in accord with the axis y. A, B and C represent those points at which the object 27 is supported by upper ends of cantilevers 23a of load sensors 23 and these points A, B and C also represent measuring points positioned on a circle with a same distance interposed therebetween, the circle taking the point O as its center. The object presses down cantilevers 23a at three measuring points A, B and C with forces determined by the imbalance of the object. Providing that the length of each of lines OA, OB and OC is r, the length of a vertical line extending vertically from points A and B to the axis y is:

$$r \sin 60° \text{ or } \frac{\sqrt{3}}{2} r$$

Providing that output values of load sensors at points A, B and C are represented by Ao, Bo and Co. Therefore, the torque X which rotates the object with the axis y centered in the direction in which first and fourth quadrants are lowered is:

$$X = \frac{\sqrt{3}}{2} r (Bo - Ao)$$

and torque Y which rotates the object with the axis x centered in the direction in which first and second quadrants are lowered is:

$$Y = r Co - \frac{r}{2}(Bo + Co) = r\left(Co - \frac{Ao + Bo}{2}\right)$$

since the length of a vertical line extending vertically to the line AB is:

$$r - r \cos 60° = r(1 - \cos 60°) = \frac{r}{2}.$$

When amounts of imbalance expressed by X and Y are combined and plotted on a polar coordinates (R, Q) using the axis x as its reference line, the maximum torque value To and maximum torque direction $\theta o$ are:

$$To = \sqrt{X^2 + Y^2} \text{ and } \theta o = \tan^{-1}\frac{Y}{X}$$

Since the relation of Ro=(To/Wo) is present among maximum torque value To, total weight $Wo=Ao+Bo+Co$ and eccentric amount Ro, the eccentric amount Ro of the imbalance can be calculated from the equation.

The calulator device 36 comprises mainly amplifiers 29p, 29q and 29r, multiplexer 30, A/D converter 32, decoder 34, interface 35 and small-sized computer 36a. The computer 36a includes a CPU 37, a memory 38, an LED (light emitting diode) 39, a keyboard 40 and a card reader 41.

Prior to the measurement of imbalance, an operational program is stored in the computer. This memory is achieved by inserting a magnetic card into the card reader 41 in this embodiment of the present invention. Using the positioning device 31, the object is mounted on the positioning device 31 in center alignment therewith. When a start key (not shown) in the keyboard 40 is pushed down, output signals are supplied from load sensors 23p, 23q and 23r to the multiplexer 30 through amplifiers 29p, 29q and 29r, respectively, then to the decoder 34 through the A/D converter 32 successively to be coded therein, and then to the computer 36a through the interface 35, and stored in the memory 38. When all of measured data supplied from load sensors 23p, 23q and 23r are stored in the memory 38 as described above, these measured data are led out of memory 38 and torques X and Y are calculated according to above-mentioned equations to obtain maximum torque value To and maximum torque angle $\theta o$. The circuit shown in FIG. 7 is simple and now well-known in the art. Further description on this circuit will be therefore omitted. Any program electronic calculator such as program electronic calculator model 97S produced by Hewlett-Packard Co., for example, and now easily available may be employed as the small-sized computer 36a.

In addition to the load sensor of cantilever type can be mentioned those of plunger type, of compression type and of other types and the device of the present invention employs load sensors of cantilever type because they are very sharp in sensitivity. Vertical portions of cantilevers 23a are directed in such a way that upper ends of vertical positions of cantilevers 23a support the object at their corresponding predetermined points or measuring points 24 on the measuring circle 25 which is concentric with the through-hole 26 of the object 27. Further, horizontal portions of cantilevers 23a are directed in such a way that they are tangential to the measuring cycle 25 when viewed in vertical direction at each of measuring points 24 while all of them are extended perpendicular to the line of sight and directed in the same sense when viewed from the center O of the through-hole 26. The reason why load sensors 23 are positioned in this way resides in that when a part of load of the object is added to upper ends of cantilevers to thereby shift these upper ends in the longitudinal direction of vertical portions of cantilevers, the resultant change in distance between measuring points 24 and the center O of the through-hole 26 can be suppressed to a small extent to make measuring errors negligible.

Figure 9A:
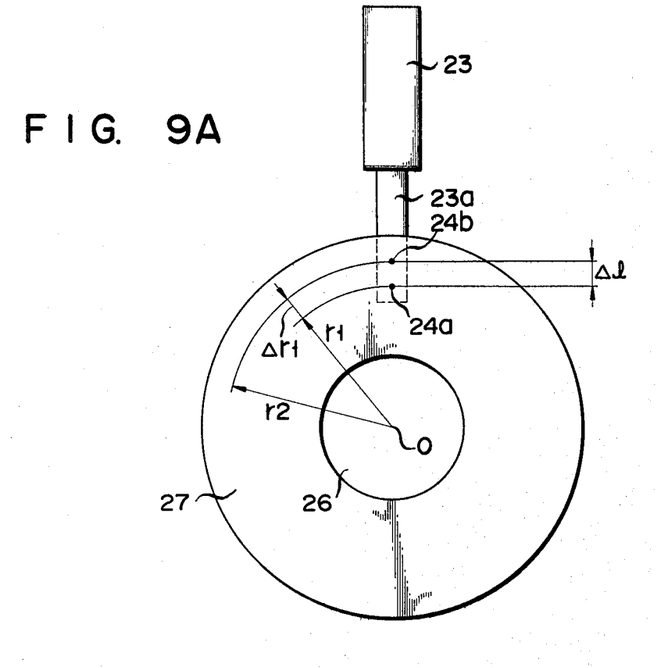
FIG. 9A is a view used to explain measuring accuracy obtained in a case where the cantilever of the load sensor is directed towards the center of the object.

FIG. 9A shows a case where the horizontal portion of the cantilever 23a is directed toward the center of through-hole 26 and then bent upward in vertical direction to contact the underside of the object and to receive the load of the object at its upper end. After calculating the resultant change in distance between the measuring point 24 and the center O of through-hole 26, it will be explained that the arrangement of load sensors 23 employed in the device of the present invention is superior to that shown in FIG. 9a. Points 24a and 24b in FIG. 9A represent the original measuring point at which the upper end of cantilever 23a is in contact with the object 27, and the point at which the upper end of cantilever 23a comes to contact with the object 27 after shifted, respectively. Providing that distances from the points 24a and 24b to the point O are r1 and r2, that the distance between r2 and r1 is $\Delta r1$, and that the distance between points 24a and 24b is $\Delta l$, the distance between the measuring point and the center O changes by $\Delta r1 = \Delta l$ as the result of the shift $\Delta l$ of the measuring point, as apparent from FIG. 9A.

Figure 9B:
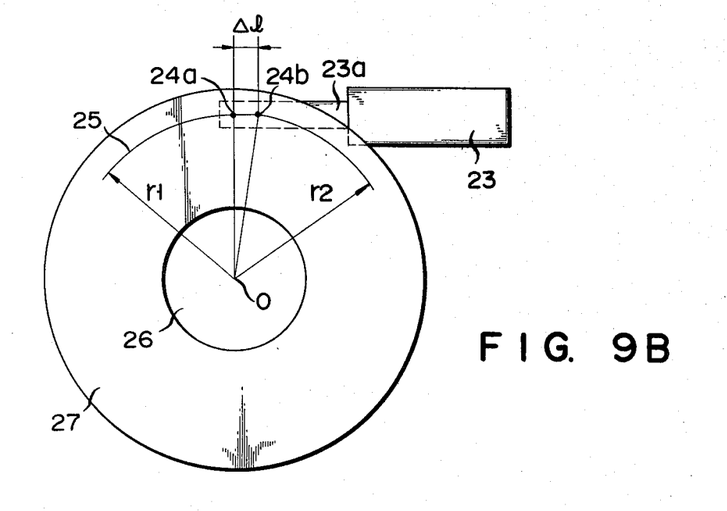
FIG. 9B is a view used to explain measuring accuracy obtained in a case where the cantilever of the load sensor is directed perpendicular to a line connecting the center of the through-hole of the object with a measuring point of the object at which the upper end of cantilever contacts the object.

FIG. 9B shows the arrangement of load sensor 23 employed in the device of the present invention. The cantilever 23a supports the object 27 at the measuring point 24a on the measuring circle 25 which takes the point O as its center and has a radius r1. The cantilever 23a is extended in a horizontal direction to be tangential to the measuring circle 25 at the measuring point 24a and then bent upward in a vertical direction to contact the object 27 at its upper end. Similarly to the case shown in FIG. 9A, the point 24b represents the measuring point obtained when the original measuring point is shifted by $\Delta l$ in the longitudinal direction of horizontal portion of cantilever 23a. For the purpose of being easily compared with the case shown in FIG. 9A, it is assumed that distances from points 24a and 24b to the center O are r1 and r2, that the difference between r2 and r1 is Δr2, and that the distance between points 24a and 24b is Δl. The positional change of measuring point is Δl and the change Δr1 in distance between the measuring point and the center O is equal to Δl in the case shown in FIG. 9A, while the positional change of measuring point is similarly Δl but the value of change Δr2 in distance between the measuring point and the center O becomes approximately r1/2(Δl/r1)² in the case shown in FIG. 9B, as will be described below.

Expressing Δr2/Δr1, $$\frac{\frac{r1}{2}\left(\frac{\Delta l}{r1}\right)^2}{\Delta l} = \frac{1}{2} \cdot \frac{\Delta l}{r1}$$

Generally as the value Δl/r1 is much smaller than 1, Δr2 becomes much smaller as compared with Δr1. When the arrangement of load sensors shown in FIG. 9B is employed, therefore, the imbalance of the object can be measured without reducing measuring accuracy even if measuring points are shifted.

The value of Δr2 in the case shown in FIG. 9B can be calculated as follows: since the triangle having vertexes O, 24a and 24b is right-angled, $$r2 = \{r1^2 + (\Delta l)^2\}^{\frac{1}{2}} = r1\left\{1 + \left(\frac{\Delta l}{r1}\right)^2\right\}^{\frac{1}{2}}$$

Since $\frac{\Delta l}{r1} \ll 1$, $$r2 \simeq r1\left\{1 + \frac{1}{2}\left(\frac{\Delta l}{r1}\right)^2\right\}$$

therefore, $$\Delta r2 = r2 - r1 = \frac{r1}{2}\left(\frac{\Delta l}{r1}\right)^2$$

When the direction of load sensors is considered from the viewpoint of friction between the object and load sensors, each of the frictional forces applied to the object has a different value and this frictional difference sometimes makes the object eccentric as in the case shown in FIG. 9A. Providing that this eccentricity amount is Δr1, an error of ΔT=Δl(Ao+Bo+Co) is caused in the measurement of torques. In the case shown in FIG. 9B, however, the error in the measurement of torques is negligible and only the following small error is caused in the measurment in the maximum torque direction θ:

$$\Delta\theta = \tan^{-1}\frac{\Delta l}{r1}$$

Therefore, no large error is caused upon determining the imbalance of the object.

According to the device of the present invention as described above, forces received from the disc-like object are measured while the object kept stationary, so that no friction is caused between load sensors and the imbalance of the object is measured with high accuracy. In addition, high sensitive load sensors of the cantilever type are employed and each of the cantilevers of the load sensors is directed tangential to the measuring circle at each of measuring points to thereby enable the measuring accuracy to be further enhanced. Further, the positioning device employed by the present invention to locate the object to its correct measurement position can also contribute to the enhancement of measuring accuracy and to the shortening of working time. Furthermore, the device of the present invention enables stationary measurement to be achieved, so that the device can be simplified, small-sized and easy to be handled and maintained, and no vibration is caused.

What we claim is:

1. A device for measuring the imbalance of a disc-like object which has a circular through-hole in the center thereof comprising:

at least three load sensors each arranged at the same distance from the center of the circular through-hole formed in said object and with the same angular interval between any two of said load sensors, and having cantilevers for supporting the object at their upper ends, said load sensors being arranged in such a way that the upper ends of said cantilevers support the object at a plurality of corresponding measuring points selected on a measuring circle which is concentric with the center of said through-hole, and that said cantilevers extend so as to be tangential to the measuring circle when viewed in the vertical direction at each of said measuring points and directed perpendicular to the line of sight when viewed from the center of said through-hole;

a positioning means for positioning the object relative to the load sensors, said positioning means including a taper rod arranged so as to be movable up and down and having a tapered portion fitted into the circular through-hole, and a support rod arranged so as to be movable up and down outside the taper rod; and a calculator means to which outputs are supplied from said load sensors to calculate the imbalance of said object.

* * * * *